United States Patent Office 2,782,001
Patented Feb. 19, 1957

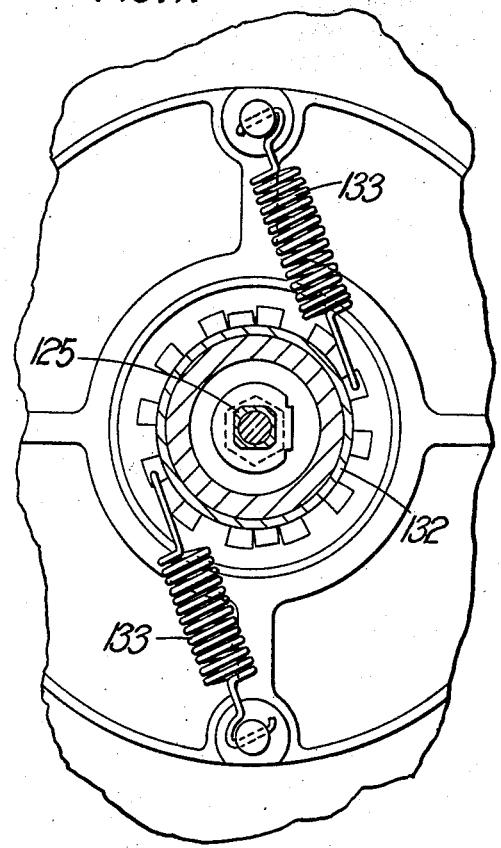

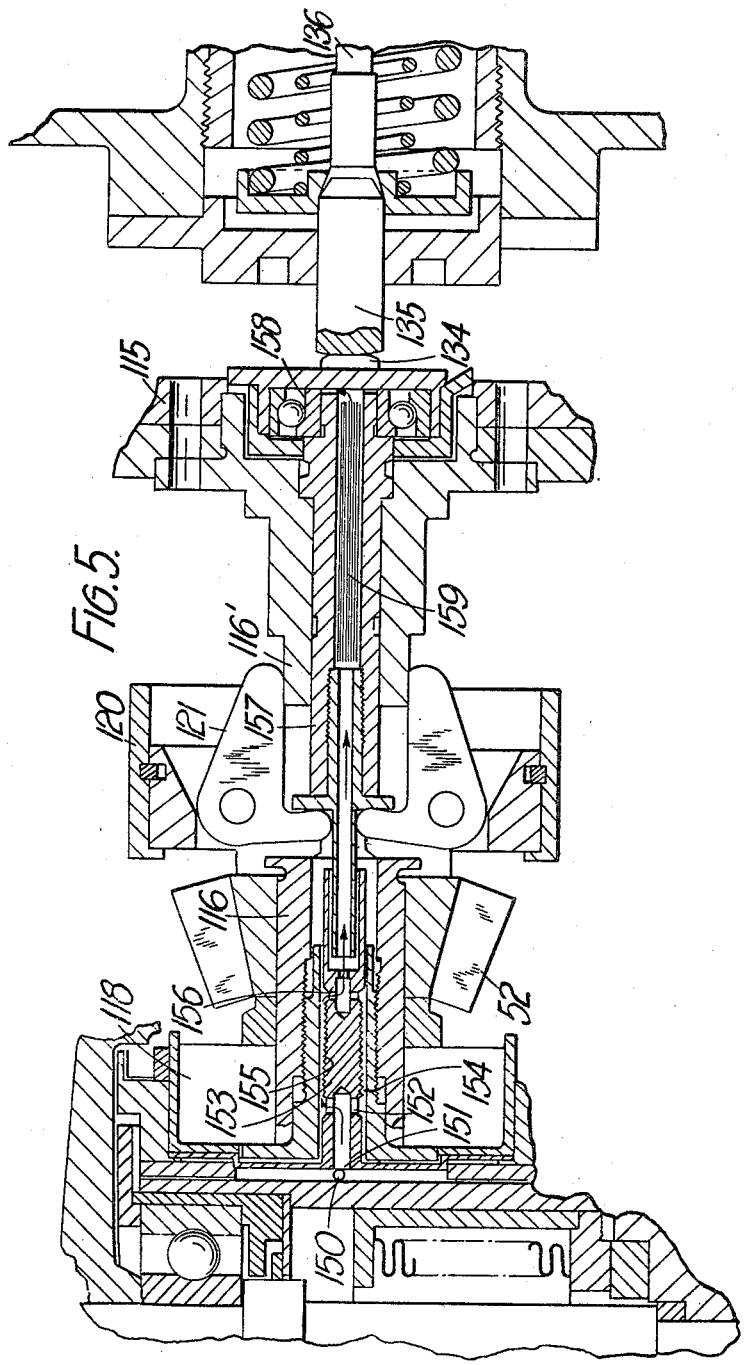

2,782,001

COMPRESSED AIR-DRIVEN TURBINES

George Charles Meredew, London, England, Kenneth Victor William Berris, Adelaide, South Australia, Australia, and Frederick Edward Samuel Smedley, Beeston, England, assignors to Bernard Bercovitz, Leaside, Ontario, Canada, and Rolls-Royce Limited, Derby, England, a British company Application February 11, 1953, Serial No. 336,378

Claims priority, application Great Britain February 26, 1952

9 Claims. (Cl. 253—59)

The invention relates to compressed-air-driven turbines and more particularly, but not exclusively, to turbines coupled to pumps and intended for submersion, with the pumps, in liquids to be pumped such as a volatile fuel.

It is an object of the invention to provide in such a turbine a particularly simple and effective governor for maintaining the speed of the turbine substantially constant.

The invention provides a compressed-air-driven turbine which is characterised by a centrifugal speed governor comprising an axially movable control valve for the supply of compressed air to the turbine, a control rod for the valve movable along the axis of rotation of the turbine rotor and one or more centrifugal governor weights which impart axial movements to the rod to operate the valve.

Preferably the valve is of the piston or sleeve type and it may be arranged to operate within an axially extending inlet conduit for the air and to control one or more ports in the circumferential wall of the conduit.

The governor weight or each weight may be in the form of a bellcrank and it may be supported in a carrier rotatable with the turbine rotor about the axis thereof, the bellcrank being supported on the carrier for pivotal movement about an axis extending in the circumferential direction and having one arm extending in the direction of the axis of rotation of the rotor to constitute the weight portion and the other arm extending radially inwardly to engage the control rod.

It is also preferred that the weights are positioned on one side of the turbine rotor, considered in the axial direction, and the valve is on the other side of the rotor.

The control rod may be divided into two parts, one free to rotate with the rotor and governor weights and the other attached to the valve and arranged for non-rotation and there may be a thrust bearing (e. g. a ball or roller bearing) between the two parts.

Figure 1:
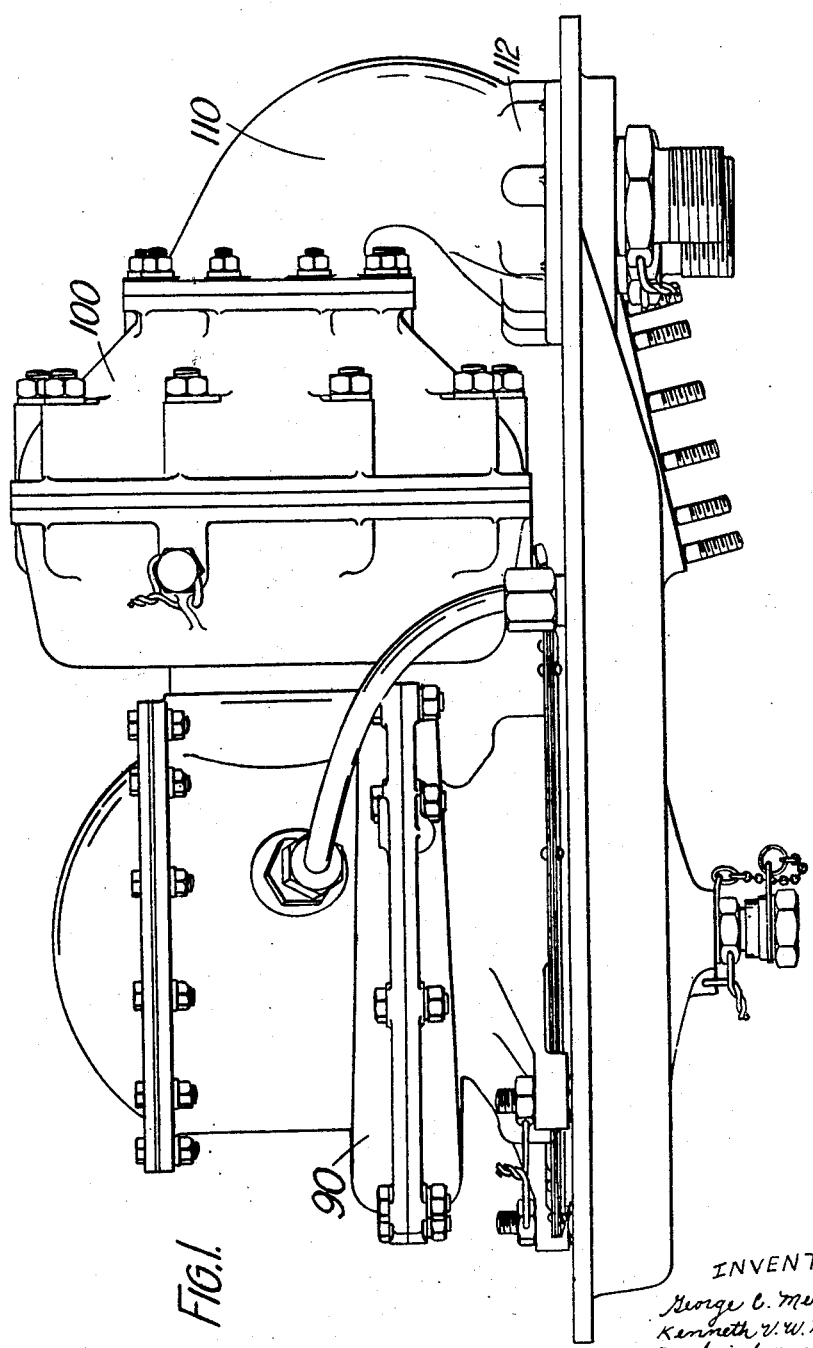
Figure 2:
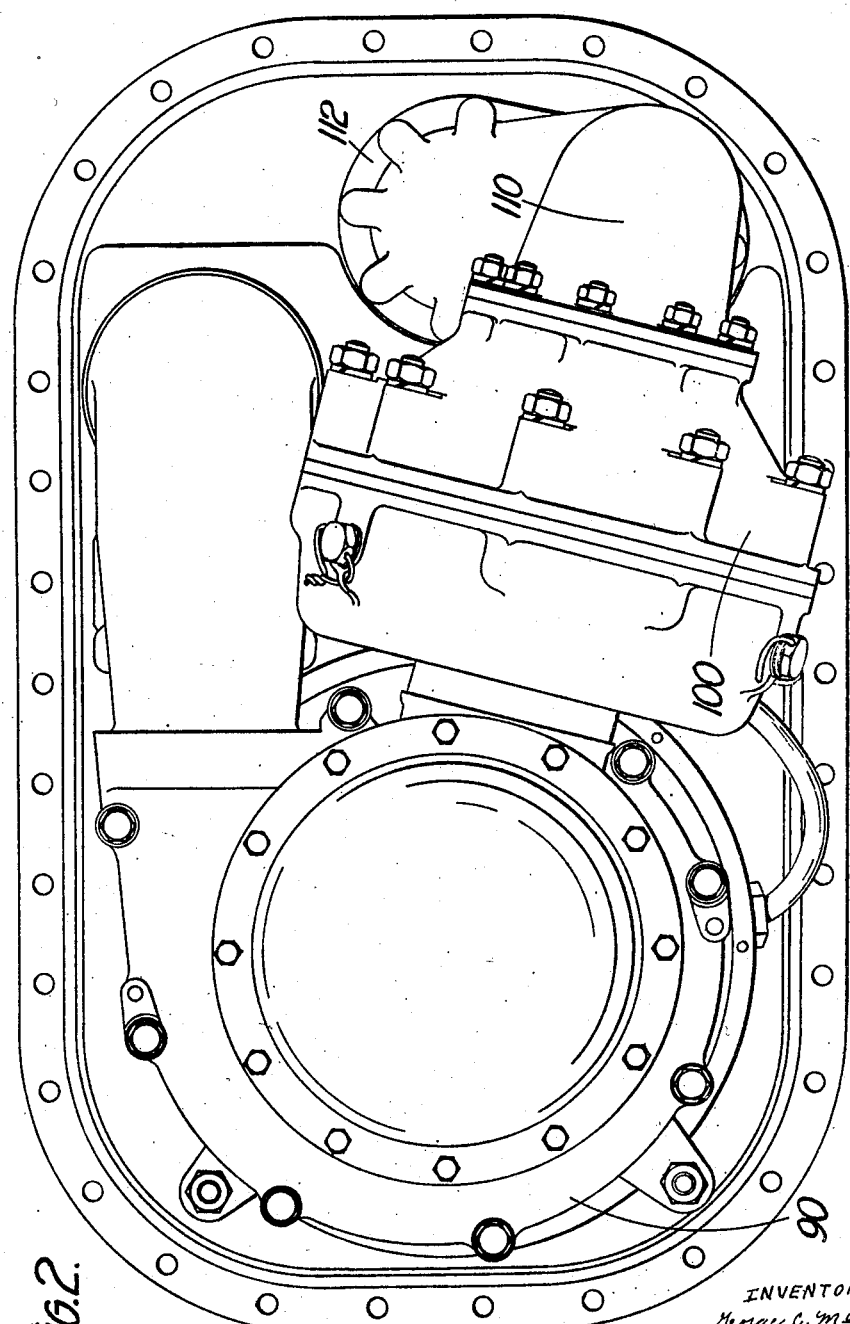
Figure 3:
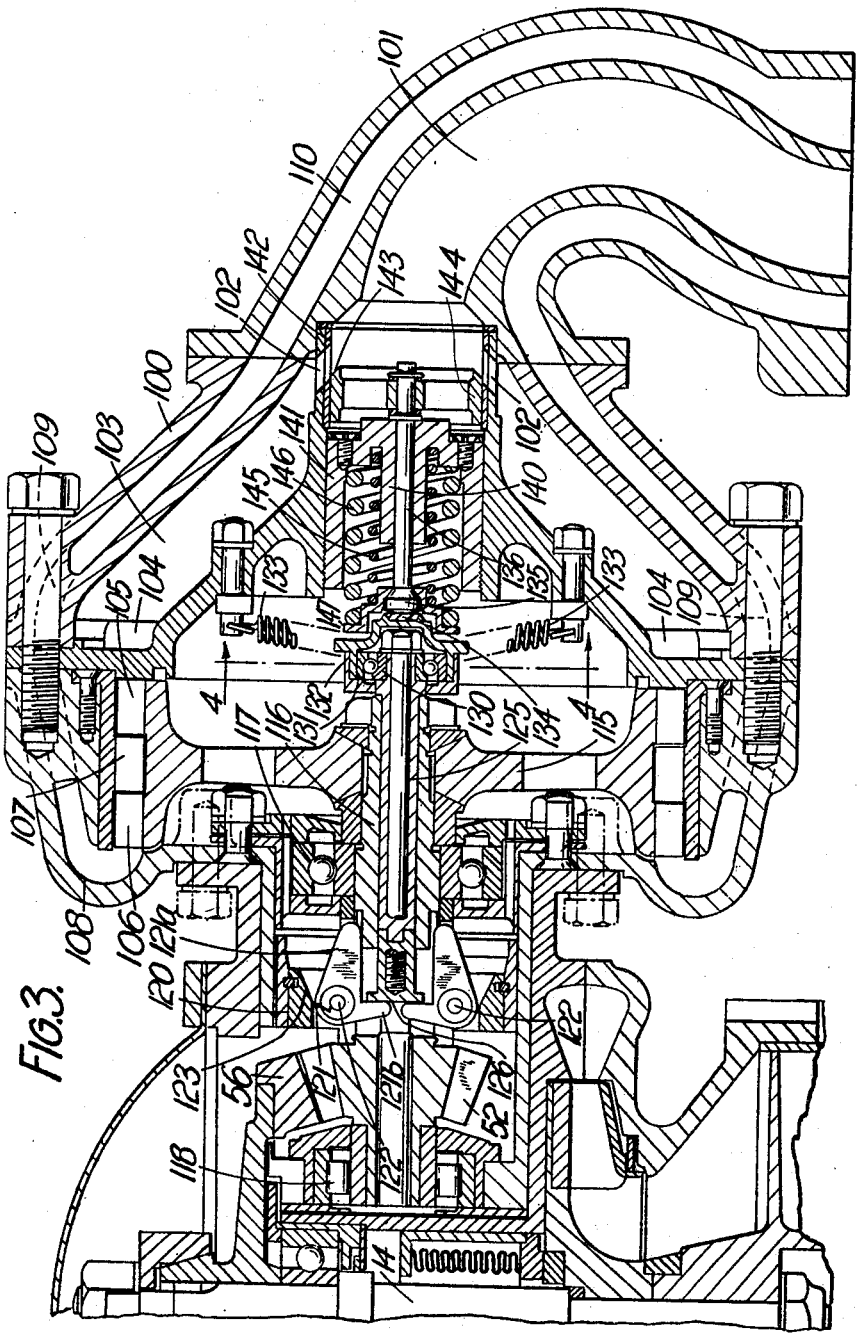

One specific construction of a turbine according to the invention and some modifications thereof will now be described by way of example, and with reference to the accompanying drawings in which:

Figure 1 represents a side view of a turbine pump unit intended for immersion in an aircraft fuel tank, Figure 2 represents a plan view of the unit, Figure 3 represents a longitudinal vertical section through the turbine and a part of the pump, Figure 4 is a view taken on line 4—4 in Figure 3, and Figure 5 represents a part vertical sectional view of a modified form of turbine and pump shown on a larger scale.

The fuel pump 90 employed in the present example is constructed as described in the specification of Patent No. 2,721,677 with reference to Figure 3 of the drawings of that specification but incorporates some modifications. The turbine 100 replaces the electric motor described in the specification of Patent No. 2,721,677 and drives the pump spindle 14 through gearing 52, 56, the axis of rotation of the turbine being normally horizontal. The turbine has two stages and is arranged for axial flow of the air in the direction towards the pump. The air enters through an inlet pipe 101 and passes through ports 102 to a tapering annulus 103 leading to a nozzle plate 104. After leaving the nozzles the air passes through two sets of moving blades 105, 106 and one set of fixed blades 107 to an outlet 108 from which it passes through a shroud 109 around the outside of the turbine to an outlet pipe 110 which surrounds the inlet pipe 101 until it reaches a fitting 112 at which the inlet and outlet pipes separate.

The turbine rotor 115 is mounted on one end of a shaft 116, the driving gear 52 being mounted on the shaft near the other end thereof. The shaft is supported, near its ends, by a ball bearing 117 and a roller bearing 118.

Secured to the rotor shaft between the gear wheel 52 and the bearing 117, there is an annular housing 120 provided with bearings for two diametrically opposed governor weights 121. Each weight is pivoted about an axis 122 extending in the circumferential direction of the housing 120 and each is in the form of a bellcrank. One arm 121a of the bellcrank extends in the axial direction and is movable outwardly to a limiting position at which it engages with the internal surface 123 of the housing. The other arm 121b of the weight extends radially inwardly to a position just short of the axis of the rotor shaft.

The rotor shaft 116 is hollow and slidable within the shaft there is one part 125 of a valve control rod. This rod has a head 126 at its inner end which is engaged by the inwardly directed arms 121b of the governor weights, the arrangement being that as the arms 121a of the weights move outwardly they push the rod in the axial direction away from the pump (i. e. towards the right as viewed in Figure 3) and through the turbine rotor. At its other end the rod carries the inner race 130 of a ball bearing of the magneto type capable of transmitting thrust. The outer race 131 of this bearing is carried in a floating housing 132 which is resiliently held against rotation by springs 133 extending between the housing and anchor pins on the turbine casing. The housing 132 is substantially closed and is packed with high melting point grease. On its end face the housing carries a hard button 134 which bears against a head 135 on the end of the other part 136 of the valve control rod. The arrangement permits this part 136 of the rod to remain stationary during rotation of the part 125 with the rotor.

The non-rotating part 136 of the control rod is axially slidable in a sleeve 140 provided by a stationary but axially adjustable part 141 of the turbine casing on the side of the rotor remote from the pump and gearing. This part of the control rod carries at its end remote from the pump a balanced sleeve valve 144 which is located within an axially extending portion 142 of the inlet conduit for the air. The valve controls the ports 102 which are in the circumferential wall of this portion of the conduit. These ports pass obliquely through the wall towards the turbine and the leading edge 143 of the valve is chamfered to correspond. The valve moves outwardly away from the pump and turbine (i. e. to the right in Figure 3) to its closed position. Surrounding the part 136 of the control rod there are two helical control springs 145, 146 for the valve. These springs act in compression between a plate 147 with a spherical seating on the head 135 on the control rod 136 and abutment surfaces on the part 141 which is, as already mentioned, axially adjustable, this adjustment being effected by screwing the part 141 into and out of the casing and providing means for adjusting the loading of the springs 145, 146. The springs tend to move the valve to its open position. The springs are designed to ensure that the valve is nearly, but not quite, isochronous. Thus in the present example, the springs are sufficiently strong to prevent the valve moving under the action of the governor weights until the rotor has reached about 14,800 R. P. M. The movement to close the valve then takes place over a range of a few hundred revolutions per minute, the range being sufficient to prevent "hunting."

When the turbine pumps are used as fuel pumps in aircraft propelled by jet engines, the compressed air for driving the turbines may be derived from the engines. Such compressed air is commonly at elevated temperature (e. g. above 200° C.) and for use with air at such high temperatures special precautions to maintain lubrication of the thrust bearing 130, 131 may be necessary. It has been found that provided suitable grease is used in the bearing housing the arrangement shown in Figures 1–4 can be operated satisfactorily up to temperatures of about 160° to 180° C. at the bearing although it is preferred that the temperature be kept below 100° C. This result may be achieved by cooling a portion of the air and directing the cooled air onto the bearing.

Figure 5 shows a modification of the above construction suitable for somewhat higher bearing temperatures (e. g. 180° to 200° C.) provided suitable oil is employed. In this construction oil (splashed by the gears) from a sump in the gear housing drains through a hole 150, passageway 151 and port 152 formed in a fixed member 153, into a space 154 between the member and the inner wall of the shaft 116'. The member 153 is formed with a screw-thread 155 so that as the shaft 116 rotates it feeds the oil along the screw-thread, towards the right in the drawing. After leaving the thread the oil passes inwardly through ports 156 into the interior of member 153 and thence along the part 157 of the push rod which in this construction is tubular and leads to the interior of the bearing 158 from which the oil is slowly lost. To control the rate of flow of oil along the push rod and hence the rate of loss, the rod is filled with wires 159.

We claim:

1. A compressed-air-driven turbine comprising a rotor including a rotor shaft having an axial bore extending along at least a part of the length of the shaft from one end thereof, a stator embodying bearings for supporting the rotor shaft during rotation, a nozzle for directing air onto the rotor and an inlet conduit for compressed air leading to the nozzle having at least one control port through which the air passes, a valve member cooperating with the port to constitute a valve to control the supply of air to the nozzle, a two-part axially extending control rod for the valve member of which one part is rotatable with the rotor shaft, is partly within, supported by and axially slidable along the bore aforesaid, with one end protruding from the end of the shaft, centrifugal means carried by the rotor for effecting axial movements of the said rod part, the other part of the rod being outside the said bore and operatively connected to the valve member to effect movements thereof on axial movements of the rod, a rolling-contact thrust bearing between the two parts of the rod comprising two races and rolling members between the races, one of the races being attached to the first-mentioned rod part for rotation therewith and means for holding the other race against rotation while permitting the thrust bearing to move axially and to float radially.

2. A compressed-air-driven turbine as claimed in claim 1 in which the holding means aforesaid are resilient.

3. A compressed-air-driven turbine as claimed in claim 1 in which the centrifugal means operate to move the rod in one direction and there is a non-rotating spring acting through the thrust bearing in opposition to the centrifugal means.

4. A compressed-air-driven turbine as claimed in claim 1 in which the thrust bearing has a thrust-transmitting engagement with the end of the second-mentioned rod part, which engagement permits relative floating movement transverse to the rod axis of the bearing and rod part.

5. A compressed-air-driven turbine as claimed in claim 1 in which the valve member is a sleeve movable in the axial direction of the rotor shaft.

6. A compressed-air-driven turbine as claimed in claim 1 in which the rotatable part of the control rod is hollow and has an outlet passage leading to one of the stator bearings, there is a fixed axial screw member within an axial bore in the shaft and passageways leading from a source of lubricating oil around the screw-threaded member and into the hollow rod whereby rotation of the shaft and rod part tends to feed oil along the thread and so through the rod to the stator bearing.

7. A compressed-air-driven turbine as claimed in claim 6 and including axially extending wires packed into the hollow rod for at least a part of the length thereof to provide restricted passageways for the oil.

8. A compressed-air-driven turbine comprising a rotor including a rotor disc and a rotor shaft with a diametrical slot intermediate in its length and an axial bore extending from one end at least to the slot, a stator embodying bearings for supporting the rotor shaft during rotation, nozzles for directing air onto the rotor and an inlet conduit for compressed air leading to the nozzles having at least one control port through which the air passes, a valve member cooperating with the port to constitute a valve to control the supply of air to the nozzle, a two-part axially extending control rod for the valve member of which one part is rotatable with the rotor shaft, is partly within, supported by and axially slidable along the bore aforesaid, one end of the rod protruding from the end of the shaft, two opposed centrifugal weights carried by the rotor for rotation therewith and having control-rod-operating parts engaging the control rod through the slot aforesaid whereby outward movement of the weights imparts axial movement to the rod, the other part of the rod being operatively connected to the valve member to effect opening and closing of the port on axial movement of the rod, a rolling contact thrust bearing between the two parts of the rod comprising two races, and rolling members between the races, one of the races being attached to the first-mentioned rod part for rotation therewith and means for holding the other race against rotation, said holding means permitting the thrust bearing to move axially and to float radially.

9. A compressed-air-driven turbine as claimed in claim 8 in which the centrifugal weights are positioned on one side of the rotor disc and the thrust bearing is on the other side.

References Cited in the file of this patent

UNITED STATES PATENTS

| 769,612 | Junggren | Sept. 6, 1904 |
| 916,779 | Piper | Mar. 30, 1909 |
| 948,791 | Nikonow | Feb. 8, 1910 |
| 1,017,571 | Loewenstein | Feb. 13, 1912 |
| 1,484,813 | Dake | Feb. 26, 1924 |
| 2,124,339 | Schellens | July 19, 1938 |
| 2,382,111 | Shepard | Aug. 14, 1945 |

FOREIGN PATENTS

| 620,511 | Germany | Oct. 23, 1935 |
| 637,743 | Germany | Nov. 3, 1936 |